US012768508B2

(12) United States Patent
Honda et al.

(10) Patent No.: US 12,768,508 B2
(45) Date of Patent: Oct. 20, 2026

(54) VEHICLE LAMP

(71) Applicant: Stanley Electric Co., Ltd., Tokyo (JP)

(72) Inventors: Kazuki Honda, Tokyo (JP); Shota Nishimura, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 0 days.

(21) Appl. No.: 18/993,928

(22) PCT Filed: Jun. 26, 2023

(86) PCT No.: PCT/JP2023/023610
§ 371 (c)(1),
(2) Date: Jan. 13, 2025

(87) PCT Pub. No.: WO2024/014271
PCT Pub. Date: Jan. 18, 2024

(65) Prior Publication Data

US 2026/0016133 A1 Jan. 15, 2026

(30) Foreign Application Priority Data

Jul. 13, 2022 (JP) ................................ 2022-112525

(51) Int. Cl.
*F21S 41/147* (2018.01)
*F21S 41/151* (2018.01)
(Continued)

(52) U.S. Cl.
CPC ........... *F21S 41/147* (2018.01); *F21S 41/151* (2018.01); *F21S 41/26* (2018.01); *F21S 41/663* (2018.01);
(Continued)

(58) Field of Classification Search
CPC ........ F21S 41/147; F21S 41/151; F21S 41/26; F21S 41/663; F21S 41/29; F21S 41/143;
(Continued)

(56) References Cited

U.S. PATENT DOCUMENTS

2015/0138822 A1* 5/2015 Tatsukawa ............ F21S 41/148
362/516
2019/0120457 A1* 4/2019 Alisafaee .............. F21S 41/143
(Continued)

FOREIGN PATENT DOCUMENTS

EP 3354545 A1 8/2018
EP 3543593 A1 * 9/2019 ............. F21S 41/63
(Continued)

OTHER PUBLICATIONS

International Search Report and Written Opinion for International Application No. PCT/JP2023/023610 dated Sep. 5, 2023.

*Primary Examiner* — Erin Kryukova
(74) *Attorney, Agent, or Firm* — Kenealy Vaidya LLP

(57) ABSTRACT

The vehicle lamp includes: a plurality of light-emitting elements; a lens that transmits light emitted from each of the plurality of light-emitting elements; and a housing that passes through the light that has transmitted through the lens; where the plurality of light-emitting elements include at least one first light-emitting element disposed on a left end side when mounted on a vehicle, and at least one second light-emitting element disposed on a right end side when mounted on the vehicle; where a first light emitted from the first light-emitting element and transmitted through the lens passes through the housing so as to spread biasedly in a rightward direction with respect to a front-rear direction when mounted on the vehicle; and where a second light emitted from the second light-emitting element and transmitted through the lens passes through the housing so as to spread biasedly in a leftward direction with respect to the front-rear direction when mounted on the vehicle.

8 Claims, 8 Drawing Sheets

(51) Int. Cl.

| | |
|---|---|
| ***F21S 41/26*** | (2018.01) |
| ***F21S 41/663*** | (2018.01) |
| ***F21W 102/155*** | (2018.01) |
| ***F21Y 115/10*** | (2016.01) |

(52) U.S. Cl.
CPC .... *F21W 2102/155* (2018.01); *F21Y 2115/10* (2016.08)

(58) Field of Classification Search
CPC .......... F21S 41/321; F21S 41/24; F21S 41/25; F21S 41/255; F21S 41/265; F21S 41/27; F21S 41/285; F21W 2102/155; F21W 2102/13; F21W 2102/165; F21W 2102/135; F21W 2102/14; F21W 2102/145; F21W 2102/15; F21W 2102/16; F21Y 2115/10
See application file for complete search history.

(56) References Cited

U.S. PATENT DOCUMENTS

| | | | | |
|---|---|---|---|---|
| 2019/0145596 | A1 * | 5/2019 | Suetsugu .............. | F21S 41/663 362/521 |
| 2020/0256534 | A1 * | 8/2020 | Ikuta ..................... | F21S 41/255 |
| 2023/0204177 | A1 * | 6/2023 | Jung ..................... | F21S 41/336 362/516 |
| 2023/0213160 | A1 * | 7/2023 | Nakanishi ............... | F21S 41/29 362/538 |

FOREIGN PATENT DOCUMENTS

| | | | | | |
|---|---|---|---|---|---|
| FR | 3056700 | A1 | | 3/2018 | |
| JP | 2013-522841 | A | | 6/2013 | |
| JP | 2016219206 | A | | 12/2016 | |
| JP | 2017-174736 | A | | 9/2017 | |
| JP | 2019-096409 | A | | 6/2019 | |
| JP | 2019-212469 | A | | 12/2019 | |
| JP | 2021-118052 | A | | 8/2021 | |
| KR | 10-1307976 | B1 | | 9/2013 | |
| KR | 20220085662 | A | * | 6/2022 | .............. F21S 41/14 |
| WO | 2019177050 | A1 | | 9/2019 | |

* cited by examiner (A)

(B)

(A)

(B)

(A)

( LOW BEAM ONLY )

(B)

( LOW BEAM AND HIGH BEAM )

(A)

(B)

VEHICLE LAMP

This application is a U.S. National Stage Application under 35 U.S.C § 371 of International Patent Application No. PCT/JP2023/023610 filed Jun. 26, 2023, which claims the benefit of priority under 35 U.S.C. § 119 to Japanese Patent Application No. 2022-112525 filed Jul. 13, 2022, the disclosures of all of which are hereby incorporated by reference in their entireties.

TECHNICAL FIELD

The present disclosure relates to a vehicle lamp.

BACKGROUND ART

The vehicle lamp described in Japanese Unexamined Patent Application Publication No. 2017-047815 (Patent Document 1) comprises a first lamp unit for forming a high beam light distribution pattern, and a second lamp unit for forming a low beam light distribution pattern. The first lamp unit has five light emitting modules, and is disposed closer to the center of an vehicle than the second lamp unit. The second lamp unit has three light emitting modules 46, and is disposed closer to the left end of the vehicle than the first lamp unit.

PRIOR ART DOCUMENT

Patent Document

[Patent Document 1] Japanese Unexamined Patent Application Publication No. 2017-047815

SUMMARY OF THE INVENTION

Technical Problem

In a specific aspect, it is an object of the present disclosure to provide a vehicle lamp capable of improving designability.

Solution to the Problem

A vehicle lamp according to one aspect of the present disclosure is a vehicle lamp including: (a) a plurality of light-emitting elements; (b) a lens that transmits light emitted from each of the plurality of light-emitting elements; and (c) a housing that passes through the light that has transmitted through the lens; (d) where the plurality of light-emitting elements include at least one first light-emitting element disposed on a left end side when mounted on a vehicle, and at least one second light-emitting element disposed on a right end side when mounted on the vehicle; (e) where a first light emitted from the first light-emitting element and transmitted through the lens passes through the housing so as to spread biasedly in a rightward direction with respect to a front-rear direction when mounted on the vehicle; and (f) where a second light emitted from the second light-emitting element and transmitted through the lens passes through the housing so as to spread biasedly in a leftward direction with respect to the front-rear direction when mounted on the vehicle.

According to the above configuration, a vehicle lamp capable of improving designability can be obtained.

MODE FOR CARRYING OUT THE INVENTION

Figure 1:
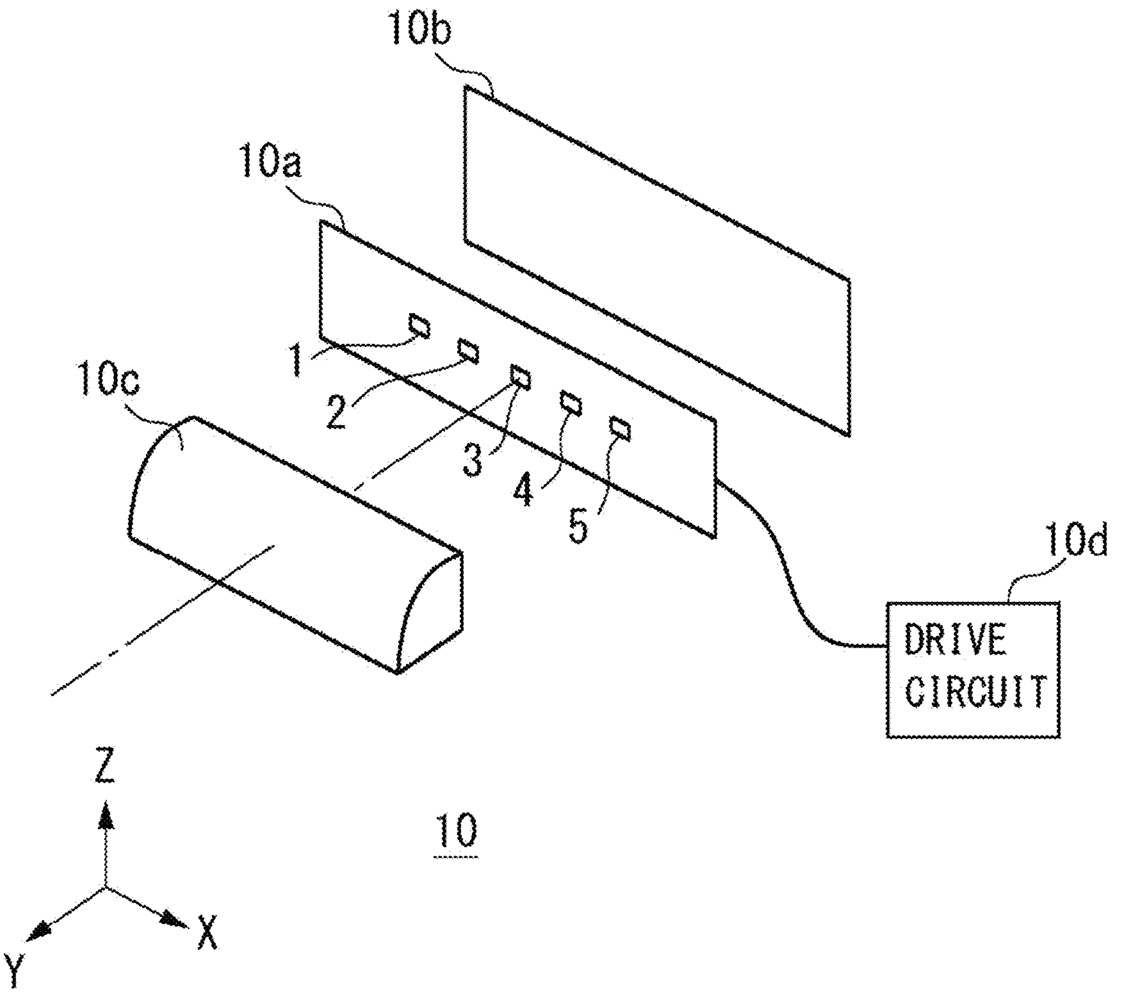
FIG. 1 is a disassembled oblique view of the optical elements of a vehicle lamp according to one embodiment.

FIG. 1 is a disassembled oblique view of the optical elements of a vehicle lamp according to one embodiment. The vehicle lamp 10 of the present embodiment is configured to include a light source substrate 10*a*, a heat sink 10*b*, a lens 10*c*, and a drive circuit 10*d*.

The light source substrate 10*a* has a plurality of light-emitting elements 1 to 5 arranged along the left-right direction (X direction in the figure) when mounted on a vehicle. In the present embodiment, an LED is considered as an example of each of the light-emitting elements 1 to 5, but each of the light-emitting elements 1 to 5 may also be a laser element.

The heat sink 10*b* is used to dissipate heat from the light source substrate 10*a* and is disposed on the rear side of the light source substrate 10*a*.

The lens 10*c* is disposed on the front side of the substrate 10*a* and transmits the light emitted from each of light-emitting elements 1 to 5 to form a light distribution pattern.

The drive circuit 10*d* is connected to the light source substrate 10*a* and drives each of the light-emitting elements 1 to 5.

Among the light-emitting elements 1 to 5 on the light source substrate 10*a*, light-emitting elements 2 and 4 are used to form a high beam, and light-emitting elements 1, 3, and 5 are used to form a low beam. Light-emitting elements 1 and 5 are located at the left and right ends, respectively. Light-emitting element 3 is located midway between light-emitting element 1 and light-emitting element 5. Light-emitting element 2 is located between light-emitting element 1 and light-emitting element 3. Light-emitting element 4 is located between light-emitting element 3 and light-emitting element 5.

Figure 2:
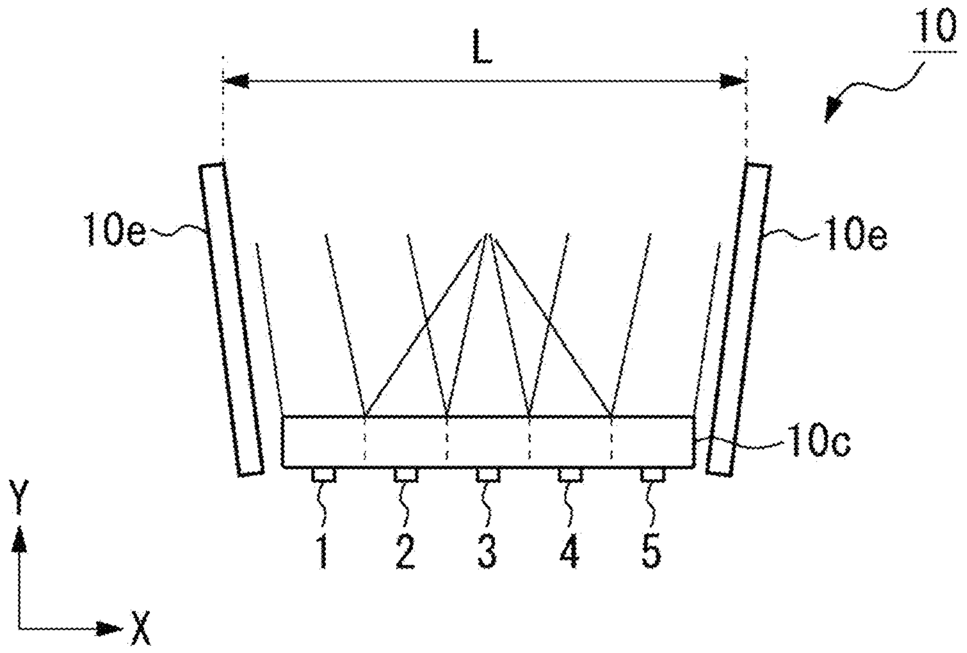
FIG. 2(A) and FIG. 2(B) are diagrams showing simplified views of cross-sectional structure of a vehicle lamp.
Figure 2:
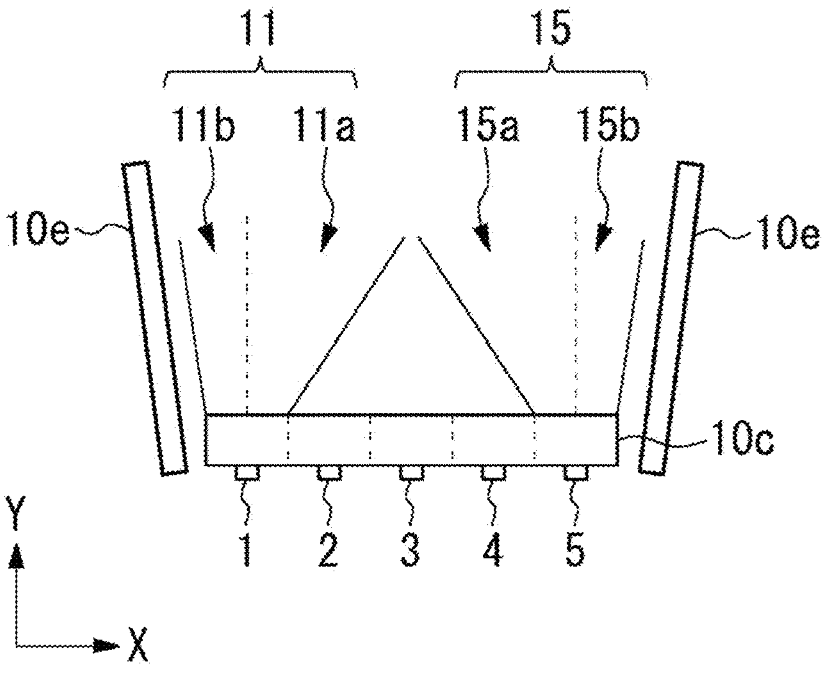

FIG. 2(A) and FIG. 2(B) are diagrams showing simplified views of cross-sectional structure of a vehicle lamp. As described above, the light emitted from each of the light-emitting elements 1 to 5 of the vehicle lamp 10 is collected by the lens 10*c* and irradiated forward of the vehicle. A housing (extension) 10*e* is provided in front of the lens 10*c* to narrow the light emitted from each of the light-emitting elements 1 to 5 to a certain range and allows it to pass through. The light emission surface of the lens 10*c* is located on the side closer to a second opening on the lower side of the housing 10*e* in the figure. As shown in the figure, this second opening has a smaller diameter than a first opening on the upper side of the housing 10*e* in the figure.

Among each of the light-emitting elements 1 to 5, the light emitted from each of the light-emitting elements 2 to 4, which are arranged between light-emitting elements 1, 5 on the left and right ends in the left-right direction when mounted on the vehicle (X direction in the figure), is collected by the lens 10*c* and spreads out almost symmetrically with respect to the front-rear direction when mounted on the vehicle (Y direction in the figure), and is irradiated forward of the vehicle.

On the other hand, as shown in FIG. 2(B), which extracts the light emitted from each of the light-emitting elements 1 and 5, the light from the light-emitting elements 1 and 5 spreads asymmetrically with respect to the Y direction and is emitted from the lens 10*c*.

In detail, light 11 from light-emitting element 1 has more component 11*a* traveling in the rightward direction with respect to the Y direction than component 11*b* traveling in the leftward direction. And this light 11 emits from the lens 10*c* toward the side away from the inner wall of the housing 10*e* on the side closest to itself, so as to spread biasedly in the opposite direction (the right side in the illustrated example) to its own position (position on the left side in the illustrated example) among the light-emitting elements 1 to 5.

Further, the light 15 from the light-emitting element 5 has more component 15*a* traveling in the leftward direction with respect to the Y direction than component 15*b* traveling in the rightward direction. And this light 15 emits from the lens 10*c* toward the side away from the inner wall of the housing 10*e* on the side closest to itself, so as to spread biasedly in the opposite direction (the left side in the illustrated example) to its own position (position on the right side in the illustrated example) among the light-emitting elements 1 to 5.

These light-emitting elements 1 and 5 are used for forming a low beam, and since it is necessary to emit light at a wider angle, the light spread angle is set larger than that of the other light-emitting elements 2 to 4. Despite this, the opening diameter L of the housing 10*e* can be narrowed by shifting the spread direction.

Figure 3:
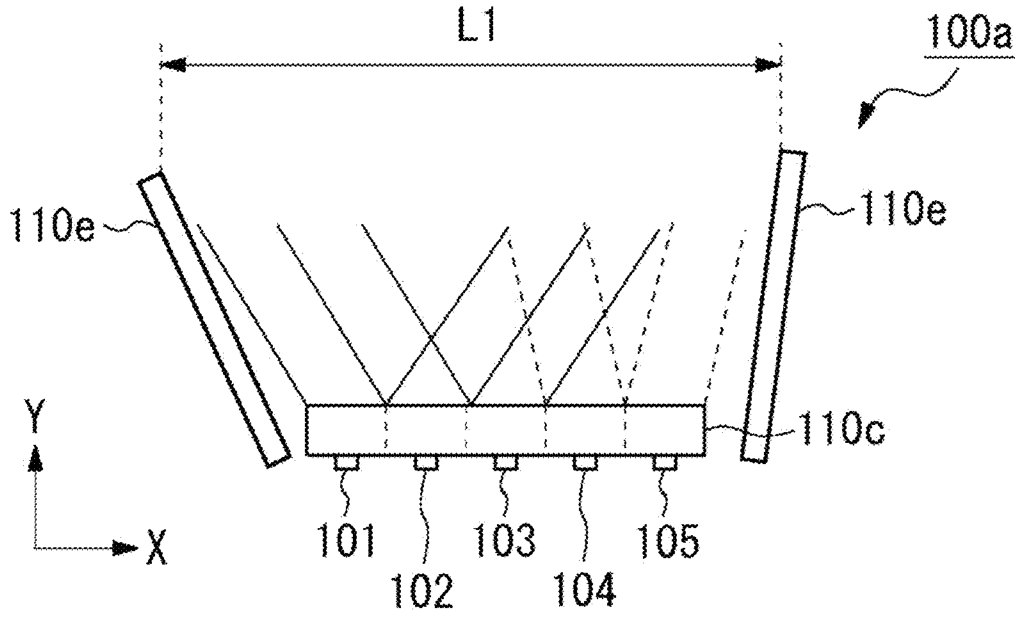
FIG. 3(A) and FIG. 3(B) are diagrams showing the configuration of a vehicle lamp of a comparative example, respectively.
Figure 3:
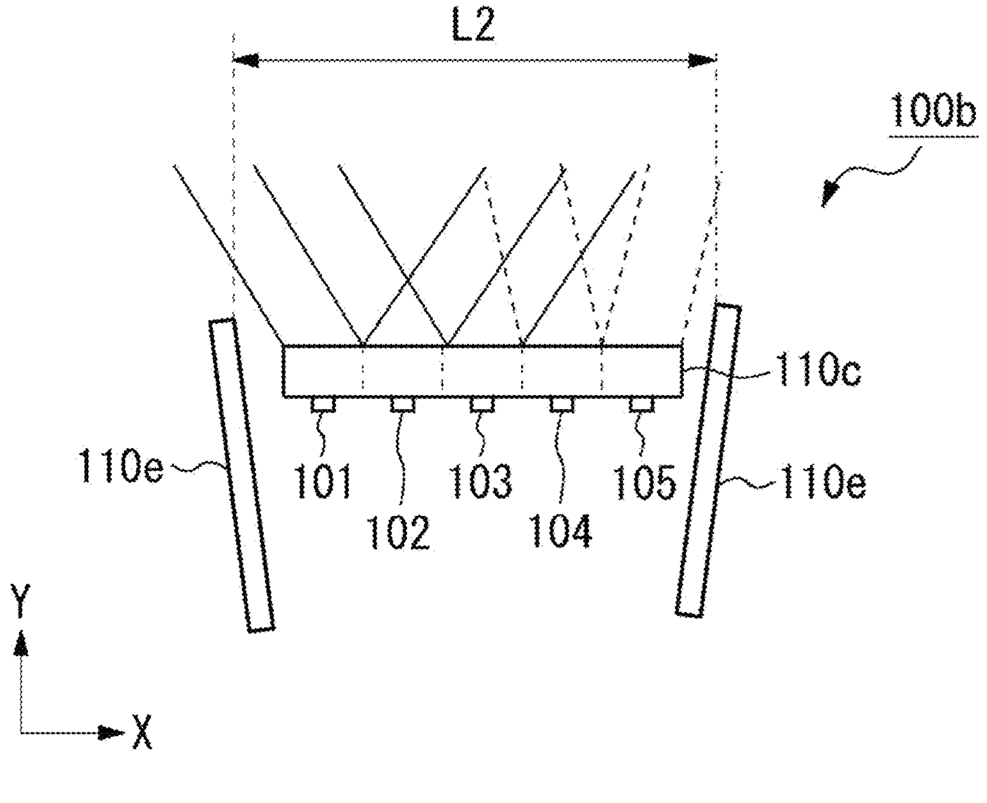

FIG. 3(A) and FIG. 3(B) are diagrams showing the configuration of a vehicle lamp of a comparative example, respectively. In each figure, the vehicle lamps 100*a*, 100*b* of the comparative examples each includes light-emitting elements 101, 102, 103, 104, 105, a lens 110*c*, and a housing 110*e*. In each of the vehicle lamps 100*a*, 100*b* of the comparative examples, the light-emitting elements 101 to 103 arranged on the left side of the figure are used for forming a low beam, and the light-emitting elements 104, 105 arranged on the right side of the figure are used for forming a high beam. And the light-emitting elements 101 to 103 are set to have a larger light spread angle than the light-emitting elements 104 and 105.

In the comparative vehicle lamp 100*a* shown in FIG. 3(A), the opening diameter L1 of the housing 110*e* is made larger than that of the vehicle lamp 10 of the above-described embodiment in order to ensure that the light from each of the light-emitting elements 101 to 103 is not blocked by the housing 110*e*. As a result, this makes the vehicular lamp 100*a* more conspicuous, which is undesirable from appearance design standpoint.

On the other hand, as in the comparative vehicle lamp 100*b* shown in FIG. 3(B), if the light-emitting elements 101 to 105 and lens 110*c* are arranged close to the upper opening of the housing 110*e* in the figure so that the light from the light-emitting elements 101 to 103 is not blocked by the housing 110*e*, the opening diameter L2 of the housing 110*e* can be made smaller, however the presence of the lens 110*c* and the light-emitting elements 101, etc. becomes more conspicuous, which is also undesirable from appearance design standpoint.

Figure 4:
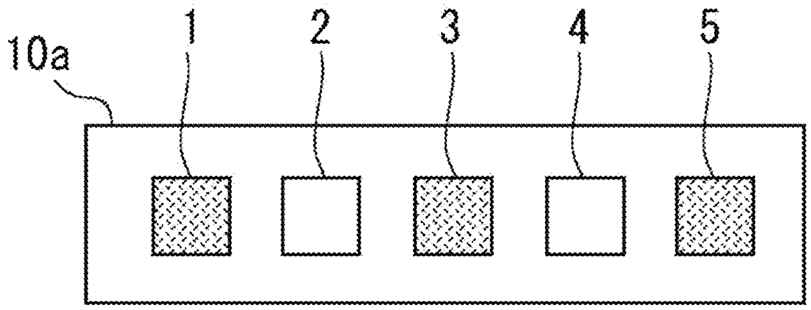
FIG. 4(A) is a schematic diagram showing the operating condition of the light-emitting elements when only a low beam is emitted.
FIG. 4(B) is a schematic diagram showing the operating condition of the light-emitting elements when emitting a low beam and a high beam.
Figure 4:
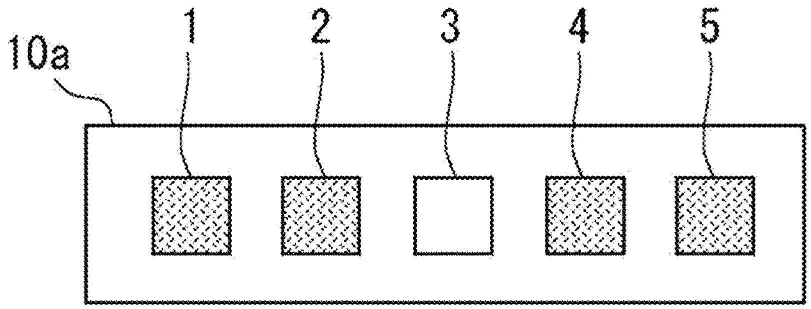

FIG. 4(A) is a schematic diagram showing the operating condition of the light-emitting elements when only a low beam is emitted. As shown in the figure, in the vehicle lamp 10 of the present embodiment, a low beam is formed by transmitting light emitted from each of the light-emitting elements 1, 3, and 5 among the light-emitting elements 1 to 5 through the lens 10*c*. Each of the light-emitting elements 1 and 5 is turned on when a driving voltage is applied from the drive circuit 10*d*.

FIG. 4(B) is a schematic diagram showing the operating condition of the light-emitting elements when emitting a low beam and a high beam. In the vehicle lamp 10 of the present embodiment, as shown in the figure, a low beam is formed by the light emitted from each of the light-emitting elements 1 and 5 among the light-emitting elements 1 to 5 transmitting through the lens 10*c*, and a high beam is formed by the light emitted from each of the light-emitting elements 2 and 4 transmitting through the lens 10*c*. Each of the light-emitting elements 1 to 5 is turned on when a driving voltage is applied from the drive circuit 10*d*.

Figure 5:
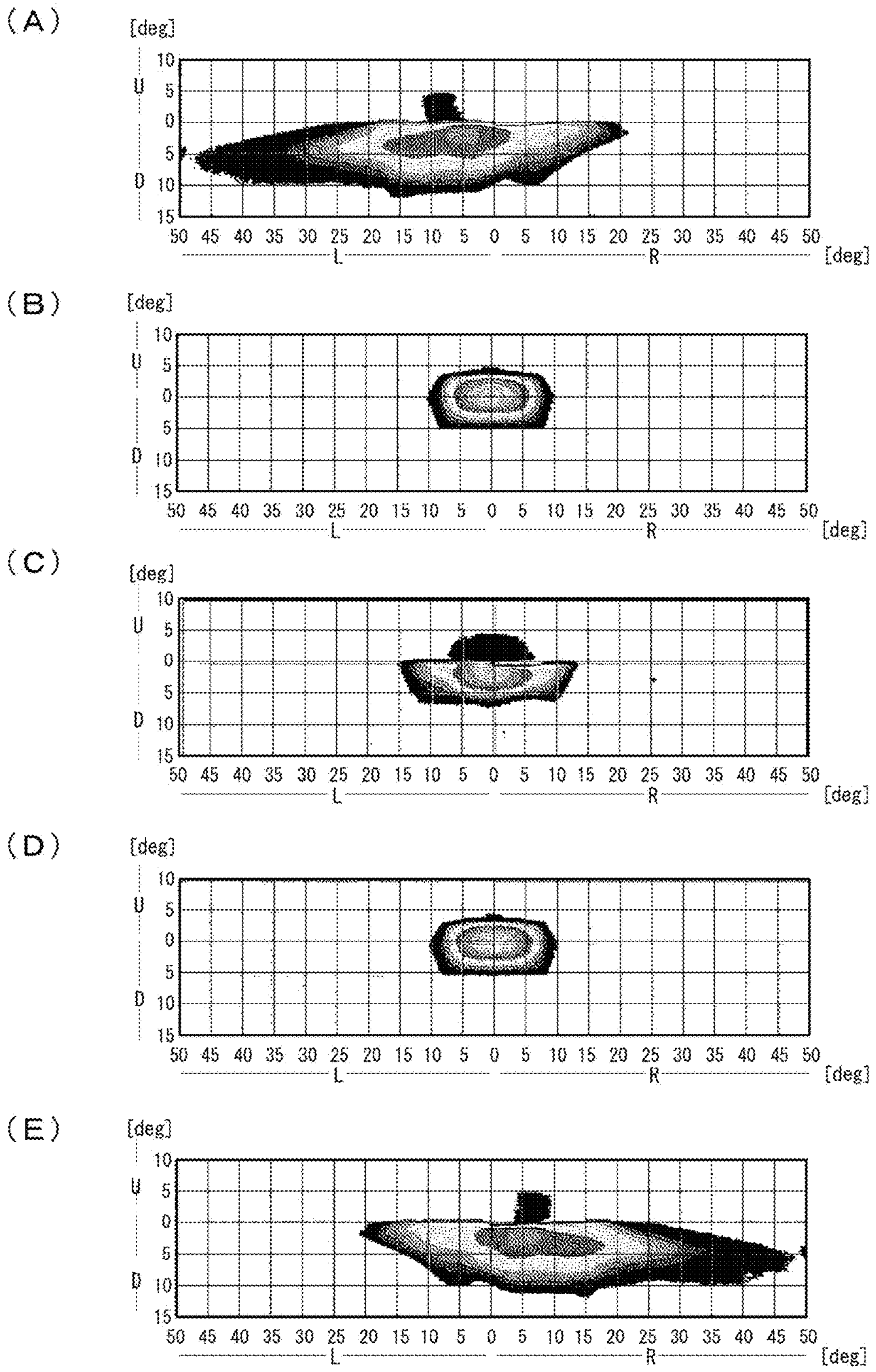
FIG. 5(A) to FIG. 5(E) are diagrams showing light distribution patterns produced by light emitted from each light-emitting element.

FIG. 5(A) to FIG. 5(E) are diagrams showing light distribution patterns produced by light emitted from each light-emitting element. FIG. 5(A) shows the light distribution pattern obtained by transmitting light emitted from light-emitting element 5 through the lens 10*c*. Specifically, this is a light distribution pattern that is mainly irradiated widely below the horizon, spreading from the center (0°) in front of the vehicle to the left side (L side).

FIG. 5(B) shows the light distribution pattern obtained by transmitting light emitted from light-emitting element 2 through the lens 10*c*. Specifically, this is a light distribution pattern that is a relatively narrow irradiation range that is mainly irradiated from approximately 5° below the horizon (D side) to approximately 5° above (U side), and is irradiated within a range of approximately 10° to the left and right from the center (0°) in front of the vehicle.

FIG. 5(C) shows the light distribution pattern obtained by transmitting light emitted from light-emitting element 3 through the lens 10*c*. Specifically, this is a light distribution pattern that is mainly irradiated from approximately 7° below the horizon (D side) to approximately 4° above (U side), and below the horizon, the light is irradiated in a range of approximately 15° to the left and right from the center (0°) in front of the vehicle, and above the horizon, the light is irradiated in a range of approximately 6° to the left and right from the center of the front of the vehicle. This light distribution pattern brightly irradiates a spot approximately 10 m from the vehicle in the center in front of the vehicle.

FIG. 5(D) shows the light distribution pattern obtained by transmitting light emitted from light-emitting element 4 through the lens 10*c*. Specifically, similar to the light-emitting element 2 described above, this is a light distribution pattern that has a relatively narrow irradiation range and is irradiated mainly from approximately 5° below the horizon (D side) to approximately 5° above (U side), and is irradiated in a range of approximately 10° to the left and right from the center (0°) in front of the vehicle.

FIG. 5(E) shows the light distribution pattern obtained by transmitting light emitted from light-emitting element 1 through the lens 10*c*. Specifically, this is a light distribution pattern that is irradiated widely, mainly below the horizon, spreading from the center (0°) in front of the vehicle to the right side (R side).

Figure 6:
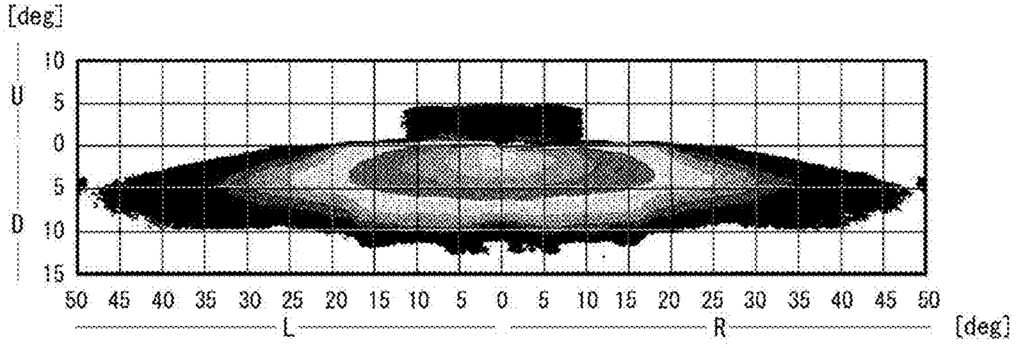
FIG. 6(A) is a diagram showing a low beam light distribution pattern.
FIG. 6(B) is a diagram showing the light distribution pattern of a low beam and a high beam.
Figure 6:
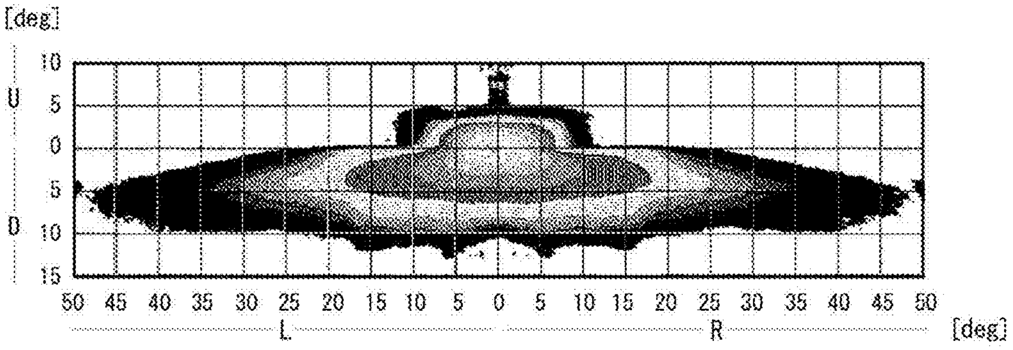

FIG. 6(A) is a diagram showing a low beam light distribution pattern. This light distribution pattern is obtained by combining the light distribution patterns shown in FIG. 5(A), FIG. 5(C) and FIG. 5(E) described above. As shown in the figure, this is a light distribution pattern that mainly irradiates below the horizon, in other words, a light distribution pattern that mainly irradiates an area relatively close to the vehicle.

FIG. 6(B) is a diagram showing the light distribution pattern of a low beam and a high beam. This light distribution pattern (first light distribution pattern) is obtained by combining the light distribution patterns shown in FIG. 5(A), FIG. 5(B), FIG. 5(D), and FIG. 5(E) described above. The light distribution pattern shown in the figure is a superposition of a low beam light distribution pattern that mainly irradiates below the horizon and a high beam light distribution pattern that irradiates the distant area in front of the center of the vehicle. That is, this is a light distribution pattern that irradiates light both to the area relatively close to the vehicle and to the area relatively far from the vehicle.

Figure 7:
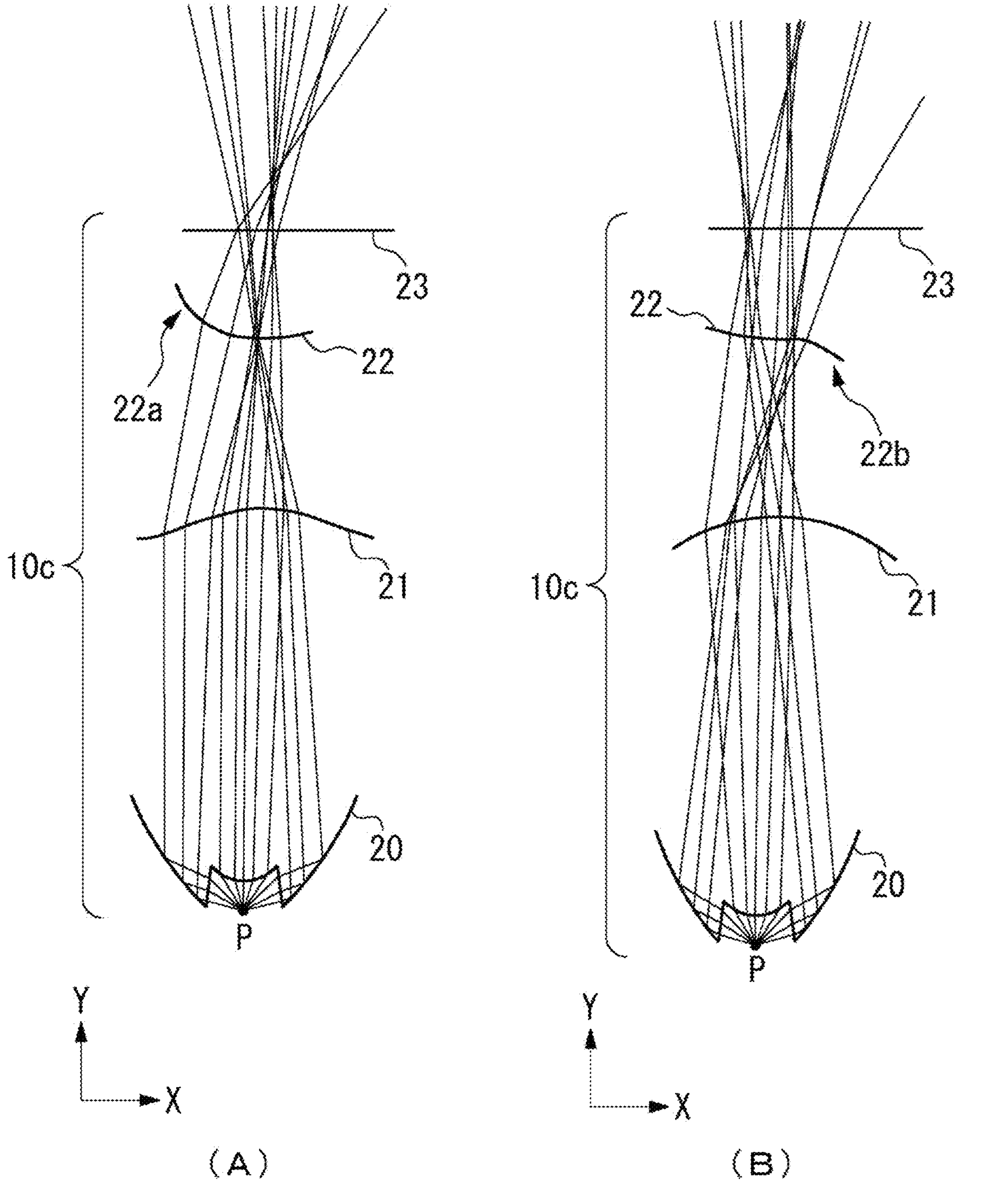
FIG. 7(A) and FIG. 7(B) are diagrams for explaining a lens configuration example for causing the light emitted from a light-emitting element to spread biasedly to a specific direction.

FIG. 7(A) and FIG. 7(B) are diagrams for explaining a lens configuration example for causing the light emitted from a light-emitting element to spread biasedly in a specific direction. In each figure, P indicates the light emission point of light-emitting element 1 (or light-emitting element 5), and 21 to 23 indicate refractive index boundary surfaces. Of the refractive index boundary surfaces, the area between refractive index boundary surface 20 and refractive index boundary surface 21, and the area between refractive index boundary surface 22 and refractive index boundary surface 23 are each filled with the constituent material of the lens 10*c*, and the area between refractive index boundary surface 21 and refractive index boundary surface 22 is a gap in which air exists. The refractive index boundary surface 23 is also the light emission surface of the lens 10*c*.

In the lens 10*c* of the configuration example shown in FIG. 7(A), the curvature is set relatively strong (large) in portion 22*a* of the refractive index boundary surface 22 on the left side in the figure. As a result, of the light emitted from the light emission point P and enters the lens 10*c*, the light component that enters portion 22*a* of the refractive index boundary surface 22 is refracted more strongly, and is further refracted at refractive index boundary surface 23 and travels biasedly to the rightward direction in the figure. With the lens 10*c* configured in this way, the light emitted from each light-emitting element 1 and 5 can be made to travel so that it spreads biasedly in a specific direction. Here, note that if each of the refractive index boundary surfaces 20 to 23 is inverted in the X direction in the figure, the direction of light bias can be reversed.

In the lens 10*c* of the configuration example shown in FIG. 7(B), the curvature is set to be relatively weak (small) in portion 22*b* of the refractive index boundary surface 22 on the right side in the figure. As a result, of the light emitted from the light emission point P and enters the lens 10*c*, the light component that enters portion 22*b* of the refractive index boundary surface 22 is refracted weaker, and is further refracted at refractive index boundary surface 23 and travels biasedly to the rightward direction in the figure. With the lens 10*c* configured in this way as well, the light emitted from each light-emitting element 1 and 5 can be made to travel so that it spreads biasedly in a specific direction. Here, note that if each refractive index boundary surface 20 to 23 is inverted in the X direction in the figure, the direction of light bias can be reversed.

Figure 8:
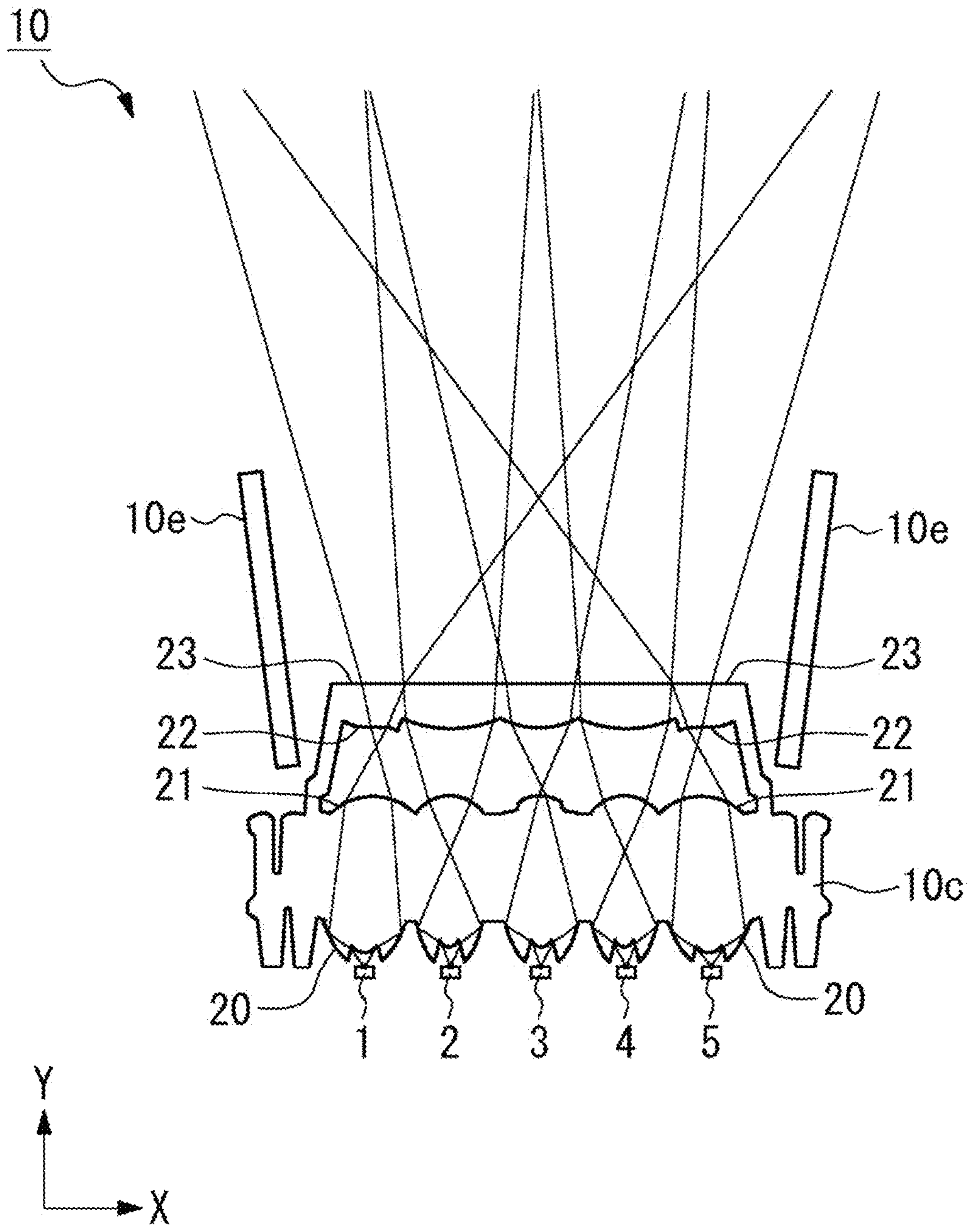
FIG. 8 is a cross-sectional view showing a more detailed working example of the lens.

FIG. 8 is a cross-sectional view showing a more detailed working example of the lens. The lens 10*c* of the working example is shown in a state where it is incorporated into the housing 10*e*. Here, for clarity of light rays indicated by thin lines, hatching is omitted. As an example, the lens 10*c* of the working example having the refractive index boundary surface described with reference to FIG. 7(B) is shown. The refractive index boundary surfaces 20 to 23 described above are used as the refractive index boundary surfaces for the light emitted from each of the light-emitting elements 1 and 5. Here, although not shown, the refractive index boundary surface described with reference to FIG. 7(A) may also be used. The refractive index boundary surface 23, which is also the light emission surface of the lens 10*c*, is disposed on the side close to the second opening on the lower side of the housing 10*e* in the figure. As shown, this second opening has a smaller diameter than the first opening on the upper side of the housing 10*e* in the figure.

According to the above-described embodiments, a vehicle lamp capable of improving designability can be obtained.

Here, note that the present disclosure is not limited to the content of the above described embodiments, and various modifications can be made within the scope of the gist of the present disclosure. For example, in the above-described embodiments, a vehicle lamp is disclosed having a mixed configuration of light-emitting elements responsible for forming a high beam and light-emitting elements responsible for forming a low beam, but the vehicle lamp may be configured to be divided into a high-beam formation and a low-beam formation. Specifically, the vehicle lamp may be configured such that all of the light-emitting elements 1 to 5 in the above-described embodiments are responsible for forming a high beam. Similarly, the vehicle lamp may be configured such that all of the light-emitting elements 1 to 5 in the above-described embodiments are responsible for forming a low beam.

Further, in the above described embodiments, light-emitting elements 1, 3, and 5 are responsible for forming a low beam, and light-emitting elements 2 and 4 are responsible for forming a high beam, but these roles may be reversed. Further, light-emitting elements 1 to 5 may be responsible for forming light other than a low beam and a high beam (for example, fog lamps, tail lamps, etc.). Furthermore, the number of light-emitting elements is not limited to five as disclosed in the above described embodiments.

In either case, the light emitted from each light-emitting element 1, 5 corresponding to the left and right directions when mounted on the vehicle can be made to spread biasedly in a specific direction without increasing the opening diameter of the housing 10*e*, thereby improving designability. Here, note that when the number of light-emitting elements is increased, instead of having one light-emitting element on each of the left and right ends when mounted on a vehicle, one can have two or more light-emitting elements on each of the left and right ends and have them emit light biased in a specific direction.

The present disclosure has features as appended below.

Appendix 1

A vehicle lamp including:

a plurality of light-emitting elements;

a lens that transmits light emitted from each of the plurality of light-emitting elements; and a housing that passes through the light that has transmitted through the lens;

where the plurality of light-emitting elements include at least one first light-emitting element disposed on a left end side when mounted on a vehicle, and at least one second light-emitting element disposed on a right end side when mounted on the vehicle;

where a first light emitted from the first light-emitting element and transmitted through the lens passes through the housing so as to spread biasedly in a rightward direction with respect to a front-rear direction when mounted on the vehicle; and where a second light emitted from the second light-emitting element and transmitted through the lens passes through the housing so as to spread biasedly in a leftward direction with respect to the front-rear direction when mounted on the vehicle.

Appendix 2

The vehicle lamp according to appendix 1, where the first light has a greater component traveling in the rightward direction than the component traveling in the leftward direction with respect to the front-rear direction when mounted on the vehicle, and where the second light has a greater component traveling in the leftward direction than the component traveling in the rightward direction with respect to the front-rear direction when mounted on the vehicle.

Appendix 3

The vehicle lamp according to appendix 1 or 2, where the housing has a first opening and a second opening having a diameter smaller than that of the first opening, and where the lens has a light emission surface disposed on a side of the housing closer to the second opening, and emits the first light and the second light from the light emission surface toward the first opening.

Appendix 4

The vehicle lamp according to any one of appendices 1 to 3, where the plurality of light-emitting elements have one or more third light-emitting element disposed between the first light-emitting element and the second light-emitting element, and where a third light emitted from the third light-emitting element and transmitted through the lens passes through the housing so as to spread approximately symmetrically with respect to the front-rear direction when mounted on the vehicle.

Appendix 5

The vehicle lamp according to appendix 4, where the first light and the second light are emitted at a wider angle than the third light.

REFERENCE SIGNS LIST

1, 2, 3, 4, 5: Light-emitting element
10: Vehicle lamp
10*a*: Light source substrate
10*b*: Heat sink
10*c*: Lens
10*d*: Drive circuit
10*e*: Housing
20, 21, 22, 23: Refractive index boundary surface

The invention claimed is:

1. A vehicle lamp comprising:

a plurality of light-emitting elements;

a lens that transmits light emitted from each of the plurality of light-emitting elements; and a housing that has an opening passes through the light that has transmitted through the lens;

wherein the plurality of light-emitting elements include at least one first light-emitting element disposed on a left end side when mounted on a vehicle, at least one second light-emitting element disposed on a right end side when mounted on the vehicle, and one or more third light-emitting element disposed between a first light-emitting element of the at least one first light-emitting element, and a second light-emitting element of the at least one second light-emitting element wherein a first light emitted from the first light-emitting element and transmitted through the lens passes through the housing so as to spread biasedly in a rightward direction with respect to a front-rear direction when mounted on the vehicle;

wherein a second light emitted from the second light-emitting element and transmitted through the lens passes through the housing so as to spread biasedly in a leftward direction with respect to the front-rear direction when mounted on the vehicle, wherein the light emitted from the plurality of light-emitting elements forms a low beam and a high beam by transmitting through the lens, and wherein, among the plurality of light-emitting elements, the light emitted from the first light-emitting element and the second light-emitting element forms at least a part of the low beam by transmitting through the lens, and wherein, among the plurality of light-emitting elements, the light emitted from a third light-emitting element of the one or more third light-emitting element, forms the high beam by transmitting through the lens, wherein the housing has a first opening and a second opening having a diameter smaller than that of the first opening, and wherein the lens has a light emission surface disposed on a side of the housing closer to the second opening, and emits the first light and the second light from the light emission surface toward the first opening.

2. The vehicle lamp according to claim 1, wherein the first light has a greater component traveling in the rightward direction than a component, of the first light, traveling in the leftward direction with respect to the front-rear direction when mounted on the vehicle, and wherein the second light has a greater component traveling in the leftward direction than a component, of the second light, traveling in the rightward direction with respect to the front-rear direction when mounted on the vehicle.

3. The vehicle lamp according to claim 2, wherein the first light includes a light distribution pattern spreading from the center in front of the vehicle to the right side, and wherein the second light includes a light distribution pattern spreading from the center in front of the vehicle to the left side.

4. The vehicle lamp according to claim 1, wherein a third light emitted from the third light-emitting element and transmitted through the lens passes through the housing so as to spread approximately symmetrically with respect to the front-rear direction when mounted on the vehicle.

5. The vehicle lamp according to claim 4, wherein the first light and the second light are emitted at a wider angle than the third light.

6. The vehicle lamp according to claim 5, wherein the first light includes a light distribution pattern spreading from the center in front of the vehicle to the right side, and wherein the second light includes a light distribution pattern spreading from the center in front of the vehicle to the left side.

7. The vehicle lamp according to claim 4, wherein the first light includes a light distribution pattern spreading from the center in front of the vehicle to the right side, and wherein the second light includes a light distribution pattern spreading from the center in front of the vehicle to the left side.

8. The vehicle lamp according to claim 1, wherein the first light includes a light distribution pattern spreading from the center in front of the vehicle to the right side, and wherein the second light includes a light distribution pattern spreading from the center in front of the vehicle to the left side.

* * * * *